(12) United States Patent
Haussler et al.

(10) Patent No.: US 6,714,171 B2
(45) Date of Patent: Mar. 30, 2004

(54) ANTENNA MOUNTING APPARATUSES AND METHODS

(75) Inventors: Bradley S. Haussler, Lincoln, NE (US); Gary A. Cumro, Alvo, NE (US); Blaine R. Bateman, Louisville, CO (US)

(73) Assignee: Centurion Wireless Technologies, Inc., Lincoln, NE (US)

( * ) Notice: Subject to any disclaimer, the term of this patent is extended or adjusted under 35 U.S.C. 154(b) by 0 days.

(21) Appl. No.: 10/394,605

(22) Filed: Mar. 21, 2003

(65) Prior Publication Data

US 2003/0231140 A1 Dec. 18, 2003

Related U.S. Application Data

(60) Provisional application No. 60/388,823, filed on Jun. 14, 2002.

(51) Int. Cl.[7] .............................. H01Q 1/12; H01Q 1/32
(52) U.S. Cl. ..................... 343/888; 343/906; 343/715
(58) Field of Search ................. 343/888, 711, 343/713, 715, 906, 878; H01Q 1/12, 1/32

(56) References Cited

U.S. PATENT DOCUMENTS

| 4,090,030 | A | * | 5/1978 | Lagasse | 343/906 |
|---|---|---|---|---|---|
| 4,218,684 | A | * | 8/1980 | Northcutt | 343/715 |
| 4,543,584 | A | * | 9/1985 | Leer | 343/881 |
| 4,882,591 | A | * | 11/1989 | Galvin et al. | 343/715 |
| 5,157,409 | A | * | 10/1992 | Hamin | 343/715 |
| 6,157,345 | A | * | 12/2000 | Hockett et al. | 343/715 |
| 6,469,678 | B1 | * | 10/2002 | Pullen | 343/888 |

* cited by examiner

*Primary Examiner*—Hoanganh Le
(74) *Attorney, Agent, or Firm*—Holland & Hart (57) ABSTRACT

The present invention provides an antenna mounting device comprising mounting unit to supply compressive force between an antenna and a panel. The mounting unit includes a forcing cone and anchor and a member designed to supply compressive force such that the anchor and forcing cone are compressed into each other.

53 Claims, 6 Drawing Sheets

United States Patent US 6,714,171 B2

ANTENNA MOUNTING APPARATUSES AND METHODS

RELATED APPLICATIONS

This application claims priority to U.S. Provisional Application No. 60/388,823, filed Jun. 14, 2002, titled ANTENNA MOUNTING APPARATUSES AND METHODS.

FIELD OF THE INVENTION

The present invention relates to antenna mounts and, more particularly, to methods and apparatuses for mounting an antenna on a vehicle surface.

BACKGROUND OF THE INVENTION

With the increase in commercial satellite, wireless, and other radio frequency (RF) communication, it has become increasingly necessary to fit vehicles with antenna capable of receiving these transmissions. Traditionally, these antennas are mounted on a vehicle roof, but could be attached at other vehicle locations, such as the trunk.

Figure 1:
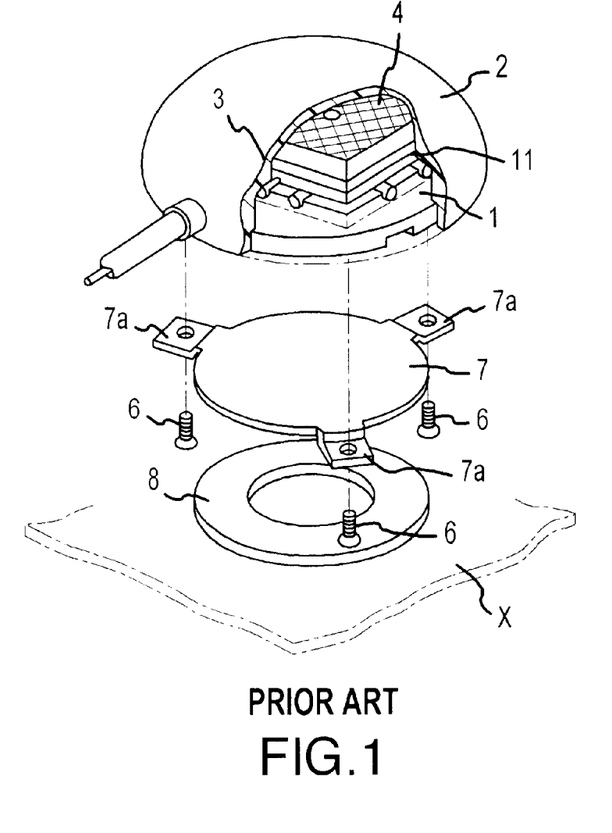
FIG. 1 is a perspective view of a conventional antenna mounted on a vehicle panel.
Figure 2:
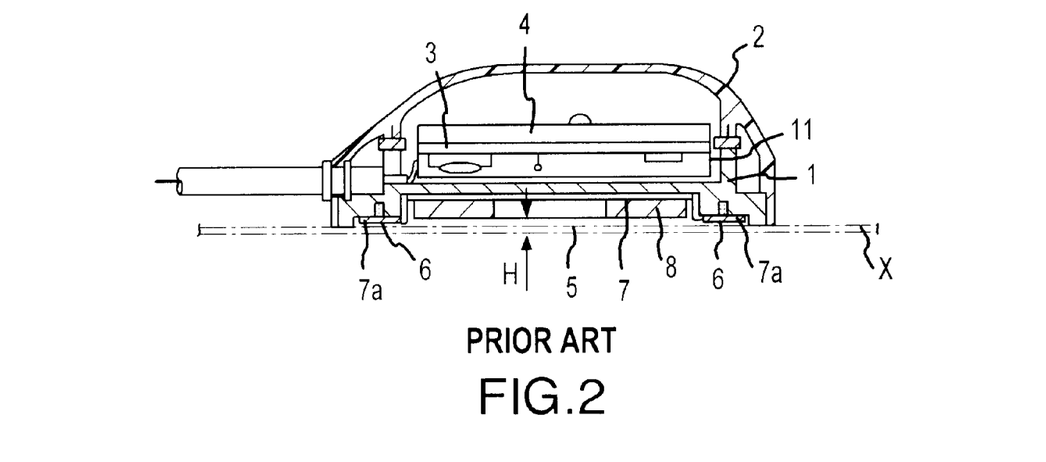
FIG. 2 is a cross sectional view of the antenna from FIG. 1.

FIGS. 1 and 2 illustrate a conventional satellite antenna. Traditionally, the receiving antenna unit is attached to the surface of the vehicle panel X. In this example, the receiving antenna unit comprises a unit casing 2 whose bottom is covered with a bottom cover 1. A circuit board 3 having circuit elements necessary for operation of the antenna covered by a metal shield or cover 11 is mounted within the unit casing 2. An antenna body 4 for receiving satellite or wireless signals is mounted in the casing 2, also. While body 4 is shown as, a flat body internal to the casing, a more traditional pole or whip antenna is possible.

One way to detachably mount the antenna on panel X involves magnetics. In this case, a recess 5 is formed in the bottom of bottom cover 1. A yoke 7 comprising a magnetic material is mounted in the recess 5, using for example, screws 6 in screw holes 7a. A magnet 8 is magnetically coupled to the yoke 7. When the antenna is placed on the panel X, a small gap H exists between panel X and magnet 8, but the magnetic attraction is sufficient to hold the antenna in place.

Another way of attaching the antenna to the panel X is with adhesive. In this case, instead of using the recess 5, yoke 7 and magnet 8, an adhesive can be applied under the bottom cover 1. The adhesive would adhere the antenna to the panel X.

Because of various deficiencies in the magnetic and adhesive methods, antennas are more commonly mounted to vehicle panels using screws. In this case, one or more screws (not specifically shown) would extend through the antenna unit casing 2, bottom cover 1, and panel X into the vehicle interior. The portion of the screw extending into the vehicle interior would mate with a corresponding nut. The screw and nut assembly would be tightened to hold the antenna to the panel X. Alternatively, the screw could extend from the vehicle interior to the exterior with the corresponding nut on the vehicle exterior.

To mount the antenna using the panel X, a worker would place and hold the antenna on the vehicle surface, such as the roof. Screws or studs would be placed in through holes that extended through the antenna and panel. Another worker, in this case interior to the vehicle, would place a nut on the stud and tighten the connection so the antenna is attached to the panel.

SUMMARY OF THE INVENTION

To attain the advantages of and in accordance with the purpose of the present invention, an antenna mounting device is provided. An antenna, such as might be used on a vehicle, is comprised of several parts which may include a housing, base, gasket, and other parts. The antenna mounting device provides a means to attach the aforementioned antenna to a panel, such as a vehicle panel. The mounting unit provides a means to supply compressive force to hold the antenna on the panel.

The foregoing and other features, utilities and advantages of the invention will be apparent from the following more particular description of a preferred embodiment of the invention as illustrated in the accompanying drawings.

BRIEF DESCRIPTION OF THE DRAWING

The above and other objects and advantages of the present invention will be apparent upon consideration of the following detailed description, taken in conjunction with the accompanying drawings, in which like reference characters refer to like parts throughout, and in which.

DETAILED DESCRIPTION

FIGS. 3–10 and the following paragraphs describe some embodiments of the present invention. Like reference characters are used wherever possible to identify like components or blocks to simplify the description of the various subcomponents described herein. More particularly, the present invention is described in relation to mounting an antenna on the roof of a vehicle; however, one of ordinary skill in the art will understand other configurations and positions are possible without departing from the spirit and scope of the present invention.

Figure 3:
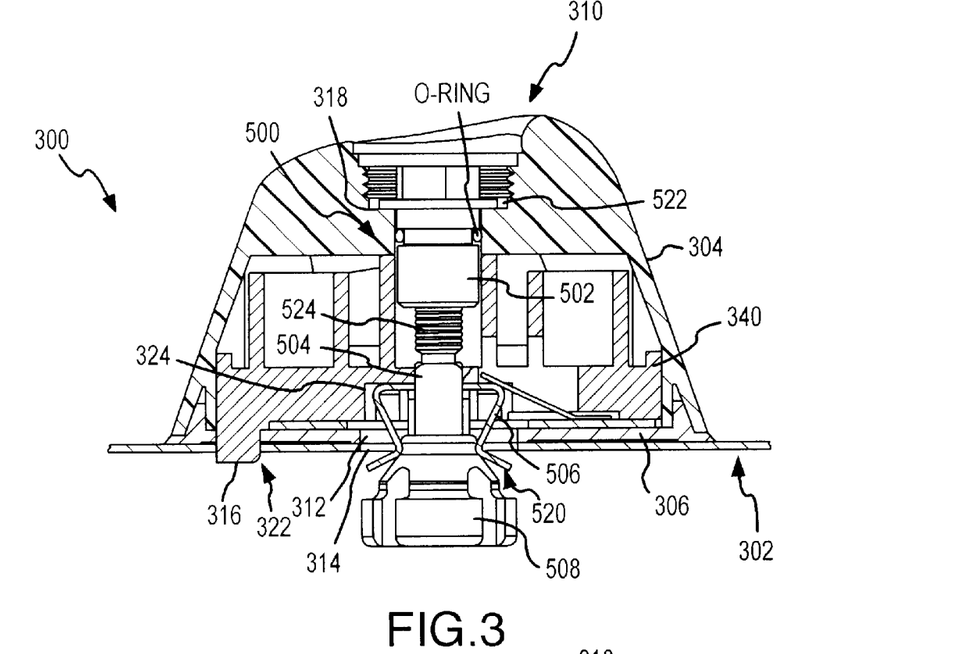
FIG. 3 is a cross sectional view of an antenna mount illustrative of the present invention.
Figure 4:
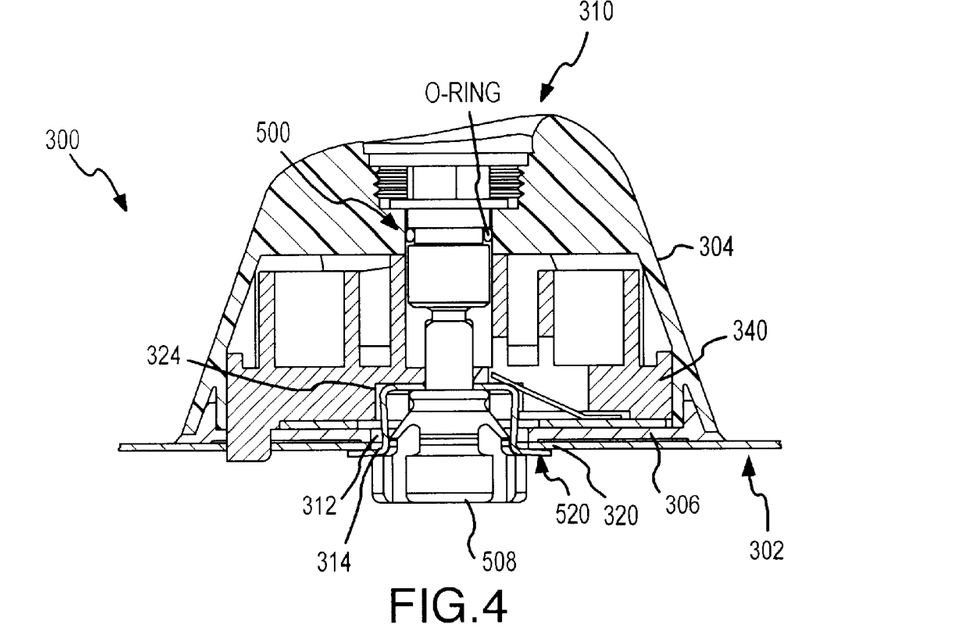
FIG. 4 is a cross-sectional view of an antenna mount illustrative of the present invention.

FIGS. 3 and 4 show an antenna mount 300 which includes a mounting device consistent with the present invention. Antenna mount 300 includes the pieces and electronics for an antenna, but those pieces are not specifically shown or labeled in FIGS. 3 and 4. In particular, FIG. 3 shows the antenna mount 300 on vehicle panel 302 prior to being tightened. FIG. 4 shows the antenna mount 300 after being tightened on vehicle panel 302. Antenna mount 300 includes a housing 304, and a base 306 between housing 304 and panel 302. Antenna mount 300 also includes a carriage 340, which may be used to affix parts of the antenna internal to antenna mount 300. Carriage 340 includes pin 316 which extends through base 306 and panel 302. Pin 316 prevents rotation of the antenna mount during installation, as will be explained further, below. Note that pin 316 could be a separate part. Also, in the case where base 306 is a rigid material, pin 316 can be incorporated into base 306 instead of carriage 340. Alternately, pin 316 could extend from housing 304.

Housing 304 includes a housing opening 310 over a base plate opening 312. Housing opening 310 and base opening 312 are aligned over a panel opening 314. Because housing opening 310 provides a leak path to the interior of the vehicle through base plate opening 312 and panel opening 314, it is beneficial to use a gasket, o-ring, or the like to inhibit leakage.

While shown extending through the geometric axis, the openings 310, 312, and 314 could be aligned off of the geometric axis as a matter of design choice. A mounting unit 500 extends through the openings to connect the antenna mount 300 to the vehicle panel 302. The mounting unit 500 will be explained in more detail below with reference to FIG. 5. While only a single mounting unit 500 is represented in the FIGS., it is possible to use multiple mounting units if desired. It is believed, however, that one mounting unit 500 is sufficient. If a design uses multiple mounting units, it would be beneficial to arrange them around the geometric axis of the antenna. Other configurations using multiple units are, of course, possible.

To assist in the prevention of leaks through the panel opening 314, base plate 306 can be a gasket, molded rubber, or the like. When base plate 306 is a gasket, for example, compressing the base plate 306 between the housing 304 and the vehicle panel 302 forms a barrier that inhibits leaks. However, base plate 306 could also be a non-compressible material, such as metal or a more rigid plastic. If base plate 306 is a more rigid material, it would be beneficial to insert a sealant (not specifically shown) around the base of the antenna mount 300 to seal any gap between the antenna mount 300 and vehicle panel 302. Types of sealants could be an o-ring, a gasket, a washer, a caulk, or an adhesive. When the antenna mount 300 is tightened on the vehicle panel, the sealant compressed between the base plate 306 and the vehicle panel 302 forms a barrier that helps to inhibit leakage to the interior of the vehicle.

Figure 5:
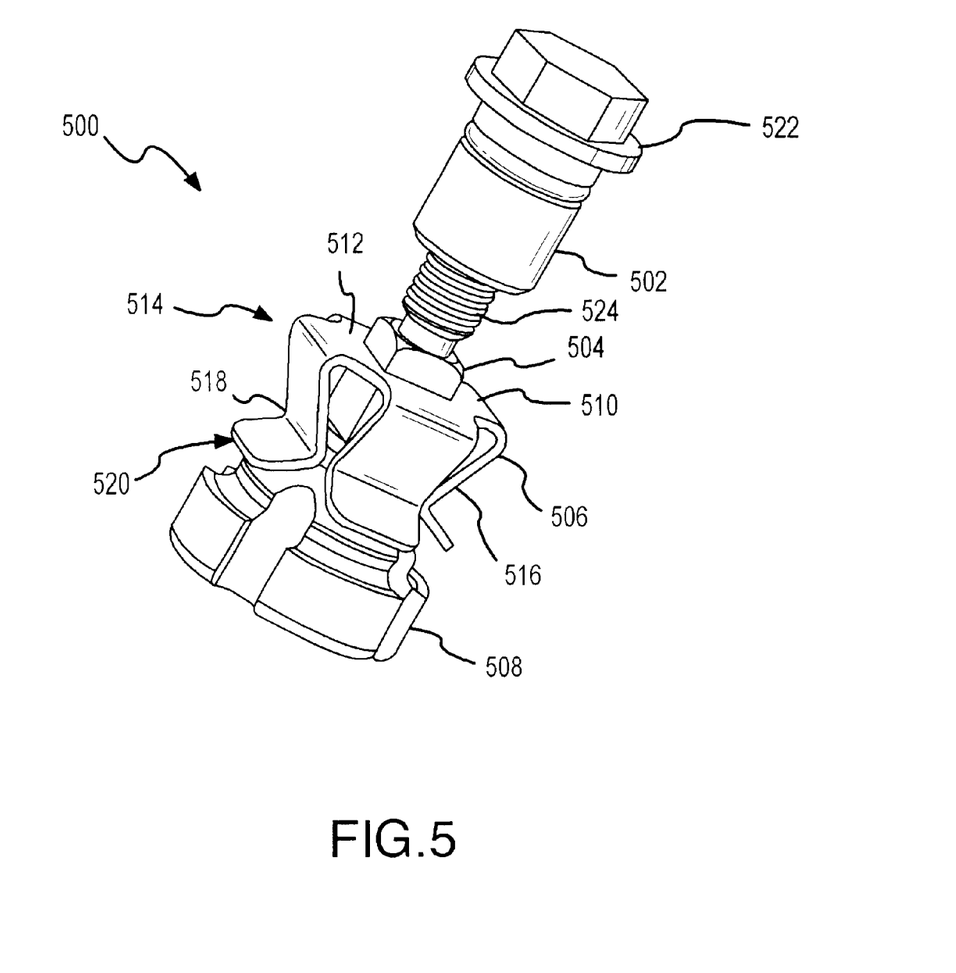
FIG. 5 is a perspective view of a mounting unit illustrative of the present invention.

Referring now to FIG. 5, the mounting unit 500 will be further explained. FIG. 5 shows a perspective view of the mounting unit 500. The mounting unit 500 includes a threaded nut 502, a threaded section 524, an anchor 506, and a forcing cone 508. Nut 502 has a lip 522, which will be explained further below. As will be explained further below, the compressive force used to hold antenna mount 300 to panel 302 is supplied by mounting unit 500, and more particularly by the force between nut 502 and forcing cone 508.

Anchor 506 includes a first surface 510 having an anchor opening 512. Key 504 extends upwards from forcing cone 508 through the anchor opening 512. At the top of key 504 there is a threaded section 524. As shown, attached around the perimeter of the first surface 510 are a plurality of first shoulders 514. Shoulders 514 connect to extensions 516 extending below first surface 510. As shown, each extension 516 angles back towards forcing cone 508 to a second shoulder 518. Each second shoulder 518 connects to an anchor lip 520. Key 504 is shown square to match anchor opening 512. The square mating between key 504 and anchor opening 512 provides a keying feature wherein the square key engages a similar feature in housing 304 or another part of the antenna mount. This keying feature thus prevents mounting unit 500, including anchor 506, from rotating while nut 502 is threaded onto threaded section 524. While the square key and anchor opening provide one keying means, alternative keying structures are possible. Moreover, key 504 and anchor opening 512 could be any geometry. The geometries are largely a matter of design choice and functionality. For example, a round key and anchor opening could be used if an alternative keying structure was used. Still further, instead of square and square, the key and anchor opening could be constructed with a rib and groove to prevent rotation. These examples of alternative key and anchor configurations should be deemed as illustrative and not limiting. Keying features as described above are useful in the case where it is not desirable that forcing cone 508 and anchor 506 rotate when nut 502 is turned, such as the case where cables must extend from within the antenna mount 300 to outside the antenna mount 300. In that case, a convenient route for the cables has been found to be alongside forcing cone 508 between the legs of anchor 506, and rotation of either of these parts could damage the cables. It will now be obvious to one of ordinary skill in the art that if rotation of forcing cone 508 and anchor 506 is permissible, or some other means of preventing rotation can be used, then no keying features are required.

As an alternative to a simple screw and nut arrangement, key 504 could have a hollow threaded section and nut 502 could have a threaded portion extending away from the nut. The threaded shaft of nut 502 and threaded hollow portion of screw 504 would mate, forming the necessary connections and supplying the seating force to mount the antenna. When nut 502 has a threaded shaft, forcing cone 508 may be internally threaded and key 504 eliminated in favor of some other keying feature.

Figure 9:
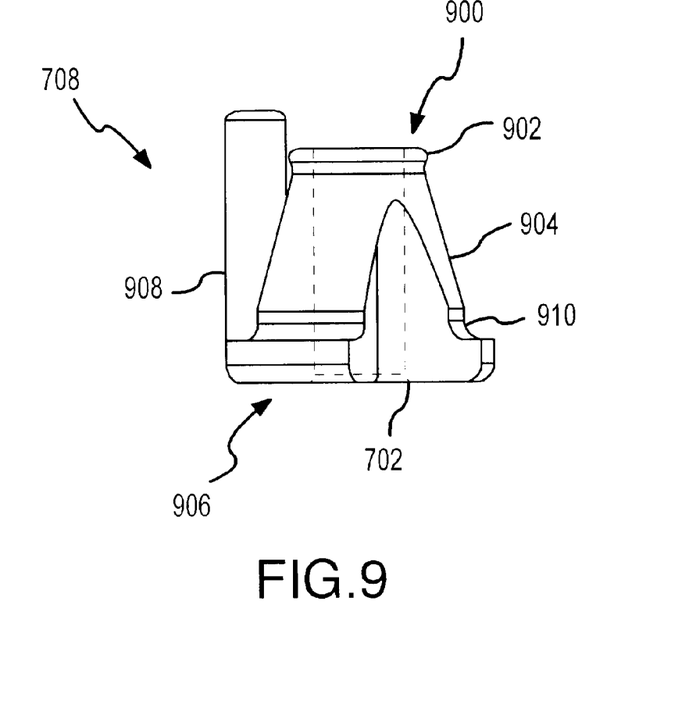
FIG. 9 is a perspective view of a forcing cone illustrative of the present invention.

Referring to FIGS. 3 and 5, the antenna mount 300 is originally assembled with the nut 502 being accessible in housing opening 310 or extending through housing opening 310. The nut 502 extends internal to the antenna mount 300 and engages the threaded section 524 that is attached to the forcing cone 508 by key 504. As explained above, anchor 506 has an anchor opening 512 through which the key 504 extends. Prior to attaching to the vehicle panel 302, the nut is tightened sufficiently so that forcing cone 508 and second shoulders 518 connect. As best seen in FIG. 9, forcing cone 508 could be designed with a lip 902. Lip 902 and second shoulders 518 of anchor 506 provide a snap lock function to hold anchor 506 and forcing cone 508 together when nut 502 is not in place or when nut 502 is not tightened.

Antenna mount 300, with mounting unit 500, is placed on vehicle panel 302 over panel opening 314. Because the extensions 518 angle back towards forcing cone 508, forcing cone 508 and a portion of the anchor 506 extend through panel opening 314 until the base plate 306 is substantially adjacent the panel 302 and lip 522 is resting on housing shoulder 318 in housing opening 310. Nut 502, which is accessible through housing opening 310 is rotated to tighten the antenna mount 300 on vehicle panel 302. Nut 502 exerts an upward force on forcing cone 508 because lip 522 resting on housing shoulder 318 prevents nut 502 from descending. Further, surface 324 prevents upward movement of anchor 506. In particular, first surface 510 and first shoulders 514 seat against surface 324. Thus, the upward force causes threaded section 524 to pull forcing cone 508 upwards into anchor 506. Forcing cone 508 moving upwards exerts an outward force on second shoulders 518 moving anchor lips 520 and extensions 516 outward. The upward force is applied until lips 520 seat on vehicle panel 302 on a seating surface 320. Thus, as explained above, anchor lips 520 extend sufficiently from second shoulders 518 so they contact vehicle panel 302 at seating surface 320 to prevent the assembly from passing through panel opening 314.

Panel opening 314 has been described as large enough to easily pass forcing cone 508 and anchor 506 through when in the non-tightened position. Panel opening 314 is designed this large to allow removal of the antenna mount 300 by simply loosening mounting unit 500. Loosening mounting unit 500 causes forcing cone 508 to descend and extensions 516 to move back inward allowing the entire unit to be removed from the vehicle.

Panel opening 314, however, could be made smaller. In such a case, for example, first shoulder 514 may not easily pass through panel opening 314. In this case, anchor 506 could be aligned over panel opening 314 with extensions 516 extending through panel opening 314. First surface 510 would remain above panel opening 314 because first shoulders 514 would extend beyond panel opening 314. Antenna mount 300 would then be placed over anchor 506 aligning base plate opening 312 and panel opening 314. Forcing cone 508 could then be inserted upwards so forcing cone 508 and threaded section 524 would extend beyond anchor opening 512 and second shoulders 518 just rest on forcing cone 508. Nut 502 could then be inserted through housing opening 310 and threaded on screw 504 until lip 522 rested on housing shoulders 318. Once connected, antenna mount 300 could be tightened on vehicle panel 302 as explained above.

Figure 6:
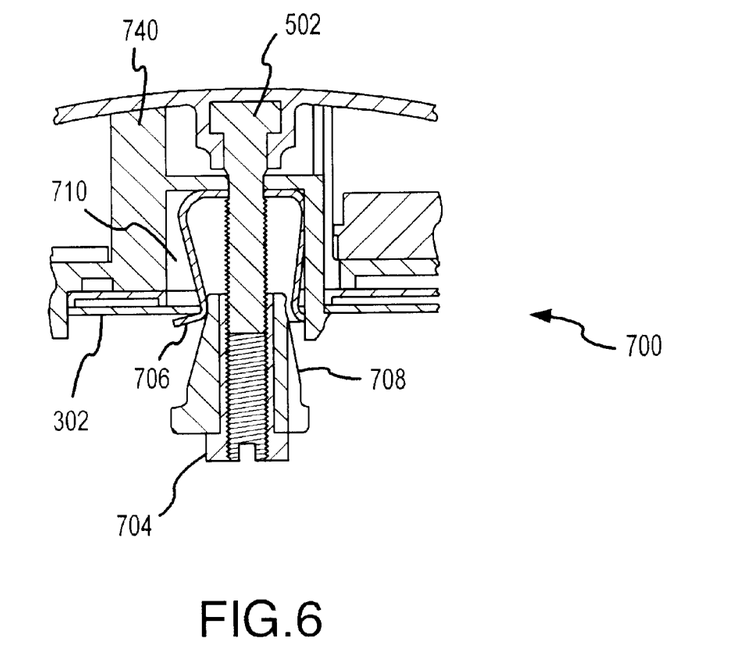
FIG. 6 is a cross-sectional view of an antenna mount illustrative of the present invention.
Figure 7:
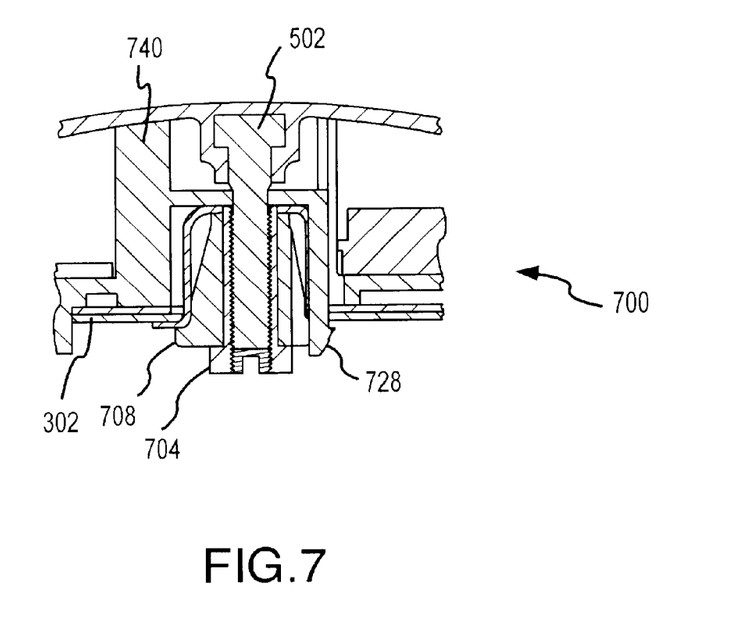
FIG. 7 is a cross-sectional view of an antenna mount illustrative of the present invention.

FIGS. 6 and 7 show another antenna mount 700 consistent with the present invention. Antenna mount 700 generally has the same parts as antenna mount 300, above. However, in this case, antenna mount 700 does not have a housing opening. Rather, screw 502 is integral to antenna mount 700. As can be seen, in this case, forcing cone 708 has a hollow section to accept a threaded nut 704. Nut 704 has a flanged portion that exists at the bottom to allow tightening of the mounting unit so that antenna mount 700 can be tightened on vehicle panel 302.

Instead of containing a hollow shaft 702 to accept the threaded nut 704, forcing cone 708 could contain a threaded center portion. Having threads on forcing cone 708 makes it necessary to rotate forcing cone 708 to tighten the antenna on the panel.

Antenna mount 700 also includes a latch 728. Latch 728 can be a friction fitting, snap lock, or the like. Also, while not shown in FIGS. 3 and 4, a latch could be included in antenna mount 300. As shown, latch 728 snaps in place to hold antenna mount 700 in place prior to tightening antenna mount on vehicle panel 302. This prevents unnecessary movement of antenna mount 700 if, for some reason, the tightening operation is performed after the mount is placed on the vehicle panel. Use of latch 728 also enables the antenna mount to be installed to a vehicle by only one person who could move from outside the vehicle after snapping antenna mount 700 in place and then perform the tightening operation.

Referring to FIG. 9, an alternative keying feature is illustrated. In this example, the keying feature includes a rib 908 attached to forcing cone 708. Rib 908 would mate with a corresponding groove in mounting cavity 710 (the groove is not specifically shown). Rib 908 mating with the groove helps inhibit the rotation of forcing cone 708 and anchor 706.

As one of ordinary skill in the art would appreciate on reading the above disclosure, the screw and nut portions supply a linear force compressing the forcing cone into the anchor so that the anchor extensions move outward. This force could be delivered using the thread section and nut, as explained, or other means. For example, in antenna mount 700, nut 502, and threaded section 524 could be replaced by a non threaded member extending from a point above the anchor 504 extending through hollow shaft 702 and terminating below forcing cone 708. A cam lock could be attached to the non threaded member such that using the cam lock applies an upwards force on the forcing cone 708 causing lips 520 to seat. Alternatively, magnets could be used to pull the forcing cone 708 upwards into anchor 504. For example, a magnet on surface 510 could attract a corresponding magnet in forcing cone 708 drawing forcing cone 708 up into the anchor so that lips 520 seat. Still further, a spring catch style lock could be employed where the forcing cone 708 is manually pushed into anchor 706 and twisted to engage a hook. A spring would push down on forcing cone 708 to lock forcing cone 708 in the hook. As can be seen, many ways to apply the necessary linear force exist and the above examples are provided to be illustrative not limiting.

Figure 8:
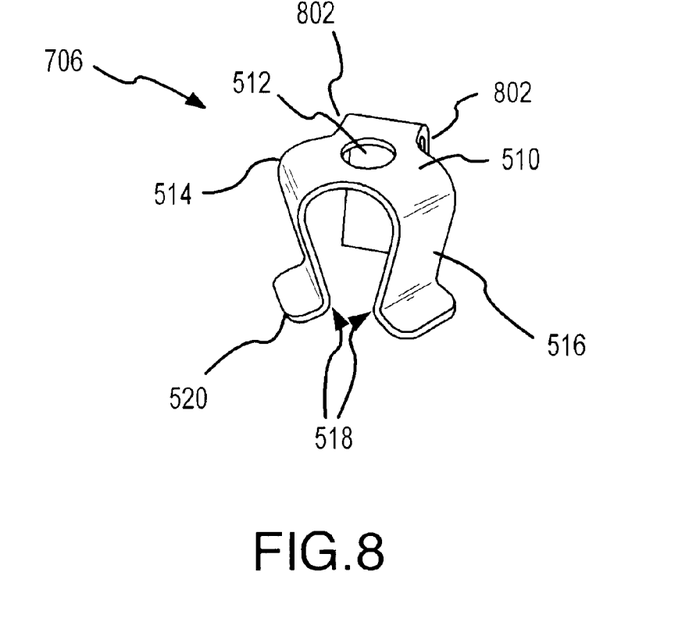
FIG. 8 is a perspective view of an anchor illustrative of the present invention.

FIG. 8 shows anchor 706 in more detail. As explained above, anchor 506 has first surface 510 and anchor opening 512. Connected to first surface 510 are the plurality of first shoulders 514. As shown in FIG. 8, three first shoulders 514 exist, although more or less are possible as a matter of design choice. For example, in FIG. 5 there are four first shoulders 514. Each pair of first shoulders 514 forms a channel 802. Channels 802 can be used to route cables and other connectors necessary for the antenna that is being mounted with the present invention.

Connected to each first shoulder 514 is an extension 516 to second shoulder 518. Extensions 516 are shown as angled back towards the geometric center of anchor 506. Attached to each second shoulder 518 is a lip 520. As shown, extensions 516 are shown angled back towards the geometric center of the anchor 506 so that when the forcing cone (shown in FIG. 9) is pulled upwards into anchor 506, the forcing cone forces second shoulders 518 and lips 520 outwards. By angling the extensions in, when the lips 520 contact the seating surface 320 (FIG. 4), the lips 520 are flush with the seating surface. Thus, extensions 516, shoulders 518, and lips 520 form a close to 90° angle in the seated position. Extensions 516, however, could be designed straight, angled outwards from the geometric center of anchor 506, or angled inwards towards the geometric center of anchor 506. With any of these angles it would be possible to have lips 520 be flush with a seating surface 320 or form an angle with the seating surface 320, although an obtuse angle would likely provide limited anchoring. Further, the customer often designates the size of panel opening 314 (FIGS. 3 and 4). Angling extensions 516 inward allows better use of the allowed space than other configurations.

As can be appreciated, at least first shoulders 514 should be formed of an elastic material, such as, for example, spring steel or an elastic composite material. Using an elastic metal that is also a conductor would allow anchor 506 to double as an electrical contact for the antenna, such as a ground connection.

FIG. 9 shows forcing cone 708 in more detail. Forcing cone 708 has a top end 900 with top end lips 902, sides 904, and a bottom end 906. As shown sides 904 flare outwards to connect top end 900 and bottom end 906. While shown as a cone, one of ordinary skill in the art would recognize other geometric configurations are possible, such as, for example a trapezoid shape or triangular shape, etc. Generally it is required that the shape of the forcing cone be sufficient to cause the extensions 516 to move outwards and seat lips 520 flush with seating surface 320. Forcing cone 708 can be any number of metals or plastics, but it has been found injection molded plastics work well. The basic requirement is that the forcing cone sides 904 have sufficient strength to force extensions 516 outwards instead of shoulders 518 dimpling or fracturing sides 904.

Further, forcing cone 708 may be threaded with threads or hollow to accept the threads of a corresponding screw that is used to tighten the antenna mount on the vehicle panel. Moreover, a rib 908 may be attached to forcing cone 508. Rib 908 would be designed to fit a mating groove or channel (not shown in the drawings) to provide a keying function so that rotation of the screw would not cause rotation of the forcing cone 708 or anchor 706.

As one of ordinary skill in the art would recognize on reading the above disclosure, sides 904 contacting second shoulders 518 of anchor 706 would tend to exert a force operating to unseat the antenna. To help inhibit this force, forcing cone 708 can be designed with a repository 910. Repository 910, in this example, forms a 90-degree seating surface so that when lips 520 are flush with seating surface 320 in the mounted and tightened position, the lips 520, second shoulders 518 and extensions 516 are in repository 910. Because repository 910 forms a 90-degree seating surface with the anchor, the unseating force is removed.

Figure 10:
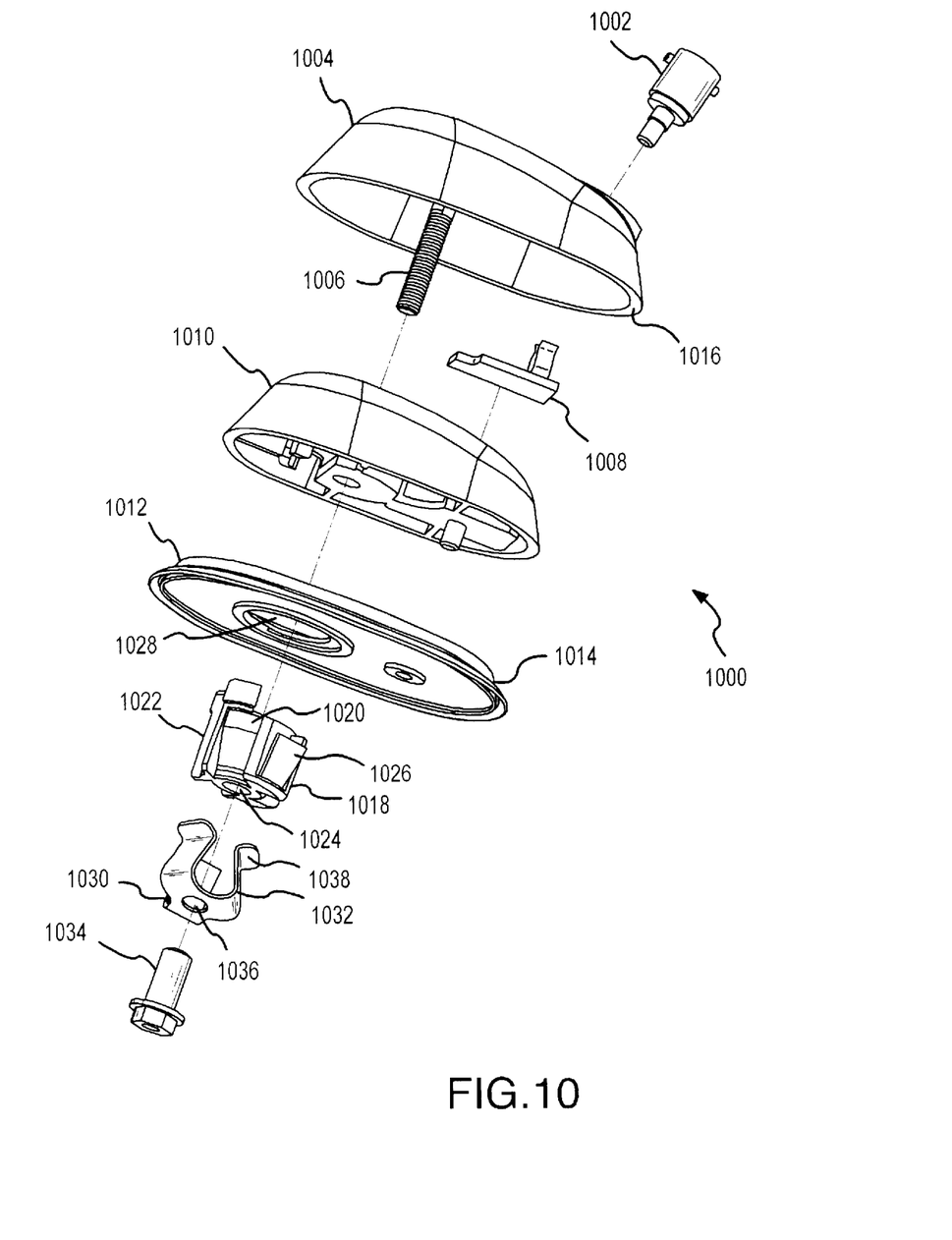
FIG. 10 is an exploded perspective view of another embodiment of the present invention.

The present invention has been described as "pulling" forcing cone up 708 in anchor 706 to seat lips 520. One of ordinary skill in the art would now recognize that the positions of the forcing cone and anchor could be reversed, such that the anchor is pulled up on the forcing cone. FIG. 10 shows an exploded view of an antenna mount 1000 arranged this way. Antenna mount 1000 should be viewed as a non-limiting example of an alternative configuration.

Antenna mount 1000 includes an insert 1002 or connection for the pole/whip antenna, an antenna housing 1004 having a connection for insert 1002 (not shown, but conventional). A screw 1006 attached to antenna housing 1004 extends below housing 1004, an antenna circuit board 1008 fits on antenna carriage 1010, and rests on insert 1012. Screw 1006 extends through carriage 1010 and insert 1012 and, when tightened, helps hold the various parts in place. In this case, insert 1012 is shown as a gasket having ridge 1014. Lip 1016 on the base of housing 1004 fits along ridge 1014 when in place. When lip 1016 is fitted on ridge 1014, gasket 1012 acts as a leak inhibitor.

Shown beneath insert 1012 is forcing cone 1018. Forcing cone 1018 has extension channels 1020, key member 1022 (which is shown as a flanged member), screw channel 1024, and snap lock 1026. In this case, forcing cone 1018 is inserted into base plate opening 1028, nut 1034 is inserted through anchor 1030 and tightened loosely, holding forcing cone 1018 in place. Alternatively, a press fit of forcing cone 1018 into carriage 1010 holds forcing cone 1018 in place. In another alternative, forcing cone 1018 could be made integral to carriage 1010, base plate 1012, or housing 1004. Snap lock 1026 is used when the antenna mount is applied to a vehicle surface, and functions the same as latch 728. Snap lock 1026 thus serves to hold the antenna mount in place on the vehicle surface before the tightening operation.

Anchor 1030 has extensions 1032. Extensions 1032 fit in channels 1020. A nut 1034 fits into screw channel 1036. Nut 1034 threads onto screw 1006. When tightened, nut 1034 moves anchor 1030 up along forcing cone 1018. Key member 1022 and channels 1020 inhibit rotation. The use of channels 1020 eliminates the need for a keying feature in anchor 1030, as compared to the example of anchor 506 and .anchor opening 512. Forcing cone 1018 causes extensions 1032 to move outward such that lips 1038 seat and hold the antenna mount 1000 in place. At the top of channels 1020 are shown vertical faces onto which extensions 1032 rest after nut 1034 is tightened. These vertical faces eliminate the force which tends to push the anchor away from the vehicle surface when nut 1034 is loosened, and thereby reduce the tendency of the antenna mount to loosen during vibration. In this way, the vertical faces at the top of channels 1020 perform the same function as repository 910 on forcing cone 708.

While the invention has been particularly shown and described with reference to exemplary embodiments thereof, it will be understood by those skilled in the art that various other changes in the form and details may be made without departing from the spirit and scope of the invention.

We claim:

1. A mount, comprising:
   a housing;
   the housing adapted to reside on a panel;
   the housing comprising at least one housing opening capable of being substantially aligned with at least one panel opening when residing on the panel; and
   at least one mounting unit extending from the housing through the at least one housing opening such that the mounting unit is adapted to supply compressive force on the housing when tightened on the panel;
   each of the at least one mounting unit comprising:
     at least one threaded section;
     at least one threaded nut adapted to be coupled to the at least one threaded section;
     at least one forcing cone coupled to at least one of the at least one threaded section and the at least one threaded nut, and
     an anchor coupled to at least one of the at least one threaded section and the at least one the threaded nut; wherein
     threading the at least one threaded section on the at least one threaded nut causes relative movement of the at least one forcing cone and the at least one anchor to supply compressive force.

2. The mount according to claim 1, further comprising a base, the base comprises at least one of a gasket, an o-ring, molded plastic, and metal.

3. The mount according to claim 1, wherein the base has at least one base opening and the housing has at least one housing opening substantially aligned with the at least one base opening, such that the at least one mounting unit extends from the at least one housing opening through the at least one base opening.

4. The mount according to claim 1, wherein
   the at least one threaded section has at least a first lip; and
   the at least one housing opening has at least a first shoulder, wherein
   at least the first lip rests on at least the first shoulder.

5. The mount according to claim 1, wherein the at least one threaded section and the at least one forcing cone are integrated into a single molded part.

6. The mount according to claim 1, wherein:
   the at least one threaded section is fixedly coupled to the housing;
   the at least one forcing cone has an annular void capable of receiving the at least one threaded section; and
   the at least one threaded section has a flange, wherein
   the at least one threaded section extends from the housing through the annular void to be threaded onto the at least one threaded nut such that tightening the at least one threaded nut causes the flange to move and contact the at least one forcing cone.

7. The mount according to claim 3, further comprising:
a panel;
the panel comprising at least one panel opening and at least one panel seating surface;
the base resides on the panel such that the at least one panel opening is substantially aligned with the at least one base opening;
each anchor comprising a first surface residing above the base, a second surface having at least one lip residing below the panel and at least one extension extending through the base opening and the panel opening to connect the first surface to the second surface;
the forcing cone comprising a forcing cone bottom, at least one forcing cone sidewall, and a forcing cone top, the forcing cone bottom being wider than the forcing cone top such that the at least one forcing cone sidewall tapers inward; wherein,
tightening the threaded section on the threaded nut causes the forcing cone top to move towards the first surface such that the at least one forcing cone sidewalls push against the second surface causing the second surface to move radially outward unit the at least one lip on the second surface seats on the panel seating surface.

8. The mount according to claim 7, wherein the anchor has at least one first shoulder connecting the first surface to the at least one extension.

9. The mount according to claim 7, wherein the anchor comprises spring steel.

10. The mount according to claim 7, wherein at least the at least one first shoulder comprises spring steel.

11. The mount according to claim 1, further comprising:
a latch adapted to removably attach the antenna mount to the panel.

12. The mount according to claim 1, further comprising:
a keying element to inhibit rotation of the mounting unit when tightening the mounting unit.

13. The mount according to claim 12, wherein the keying element comprises a rib attached to the forcing cone and a groove in the antenna mount.

14. The mount according to claim 1, wherein the at least one anchor comprises at least one channel through which cables can be routed.

15. The mount according to claim 1, wherein the at least one forcing cone moves when the at least one mounting unit is tightened and the anchor remains relatively stationary.

16. The mount according to claim 1, wherein the forcing cone is coupled to the housing such that the forcing cone remains relatively stationary during tightening of the at least one mounting unit.

17. An mount, comprising:
a housing;
the housing comprising at least one housing opening;
the at least one housing opening comprising at least one housing shoulder;
at least one mounting cavity residing internal to a chamber formed by the housing, each mounting cavity comprising a mounting cavity first side and a mounting cavity second side, such that the mounting cavity second side resides above and substantially adjacent to one of at least one panel openings, the mounting cavity first side residing above the mounting cavity second side, the mounting cavity first side comprises at least one mounting cavity shoulder;
at least one mounting unit, comprising:
at least one threaded section, each of the at least one threaded section comprising a housing end and a panel end, the threaded section having a screw lip located proximate the housing end, the housing end being accessible through at least one housing opening such that the mounting unit can be tightened;
at least one threaded nut, each of the at least one threaded nut being threaded on the threaded section between the housing end and the panel end;
at least one anchor coupled to at least one of the at least one threaded nut and at least one threaded section, each of the at least one anchor comprising a first anchor surface, at least a first anchor shoulder, at least one extension, at least a second anchor shoulder, and at least one anchor lip, the first anchor surface connected to the at least one extension by the first anchor shoulder, the at least one extension connected to the at least one anchor lip by the second anchor shoulder, the first anchor surface resides substantially in the at least one mounting cavity such that the at least one extension extends from the at least one mounting cavity through the at least one housing opening whereby the anchor lip resides outside the chamber;
at least one forcing cone coupled to at least one of the at least one threaded nut, the at least one threaded section, and the at least one anchor, each of the at least one forcing cone comprising a first forcing cone side, a second forcing cone side, and at least one forcing cone sidewall connecting the first forcing cone side to the second forcing cone side, the first forcing cone side resides proximate the first anchor surface in the mounting chamber, the second forcing cone side has a width greater than the first forcing cone side and resides proximate the anchor lip outside the chamber,
such that tightening the at least one threaded section causes the screw lip to seat on the at least one housing shoulder and the at least one forcing cone to move into the at least one mounting cavity causing the first anchor surface to seat against the at least one mounting cavity shoulder and the forcing cone sidewalls to contact the second anchor shoulder and push the second anchor shoulder radially outwards.

18. The mount according to claim 17, further comprising a base, the base comprising a compressible material.

19. The mount according to claim 17, wherein the anchor further comprises at least one channel to provide at least one path to route at least one cable.

20. The mount according to claim 17, wherein the at least one anchor is made out of a conducting material.

21. The mount according to claim 17, wherein each first anchor shoulder is made out of an elastic material.

22. The mount according to claim 17, wherein the first anchor surface has a cutout capable of surrounding the threaded nut.

23. The mount according to claim 17, wherein the at least one threaded nut and the at least one forcing cone are integrated into a single part.

24. The mount according to claim 17, wherein the at least one forcing cone has at least one forcing cone ridge proximate the first forcing cone side such that the at least one forcing cone and the at least second anchor shoulders form a snap lock to couple the at least one forcing cone to the at least one anchor.

25. The mount according to claim 17, wherein the at least one forcing cone has at least one forcing cone seat proximate the second forcing cone side such that the at least one anchor lip, the at least one anchor second shoulder, and the at least one extension reside in the at least one forcing cone seat when the at least one mounting unit is tightened.

26. The mount according to claim 17, wherein the at least one forcing cone has at least one of a triangle shape, a cone shape, a trapezoid shape, an spherical shape, and an elliptical shape.

27. The mount according to claim 17, further comprising:
   a panel; and
   the panel comprising at least one panel opening substantially aligned with the at least one housing opening, the at least one panel opening comprising at least one panel seating surface,
   such that the at least one anchor lip seats on the at least one panel seating surface when the at least one mounting unit is tightened.

28. The mount according to claim 27, wherein the at least one panel opening is sufficiently wide to allow removal of the antenna mounting device when the at least one mounting unit is loosened and sufficiently narrow to allow seating of the at least one anchor lip when the mounting unit is tightened.

29. An mount, comprising:
   a housing;
   a base;
   the housing residing on the base;
   the housing comprising at least one receptacle;
   the base comprising at least one base opening;
   the at least one receptacle aligned substantially above the at least one base opening;
   at least one mounting cavity residing internal to a chamber formed by housing residing on the base, each mounting cavity comprising a mounting cavity first side and a mounting cavity second side, such that the mounting cavity second side resides above and substantially adjacent to one of the at least one panel openings, the mounting cavity first side residing opposite the mounting cavity second side, the mounting cavity first side comprises at least one mounting cavity shoulder;
   at least one mounting unit, comprising:
      at least one threaded screw, each of the at least one threaded screw comprising a housing end and a panel end, the threaded screw being contained in the at least one receptacle at the housing end such that the at least one threaded screw is relatively stationary;
      at least one anchor, each anchor comprising a first anchor surface such that the first anchor surface has a through hole through which the threaded screw may pass, at least a first anchor shoulder, at least one extension, at least a second anchor shoulder, and at least one anchor lip, the first anchor surface connected to the at least one extension by the first anchor shoulder, the at least one extension connected to the at least one anchor lip by the second anchor should, the first anchor surface resides substantially in the at least one mounting cavity such that the at least one extension extends from the at least one mounting cavity through the at least one base opening whereby the anchor lip resides outside the chamber;
      at least one forcing cone comprising through which the threaded screw may pass, each of the at least one forcing cone comprising a first forcing cone side, a second forcing cone side, and at least one forcing cone sidewall connecting the first forcing cone side to the second forcing cone side, the first forcing cone side resides proximate the first anchor surface in the mounting chamber, the second forcing cone side has a width greater than the first forcing cone side and resides proximate the anchor lip outside the chamber;
      at least one threaded nut, each of the at least one threaded nut being threaded on the threaded screw proximate the panel end such that the at least one anchor and the at least one forcing cone reside on the threaded screw between the at least one threaded nut and the housing end,
   such that screwing the at least one threaded nut on the at least one threaded screw moves the forcing cone into the at least one mounting cavity causing the first anchor surface to seat against the at least one mounting cavity shoulder and the forcing cone sidewalls to contact the second anchor shoulder and push the second anchor shoulder radially outwards.

30. The mount according to claim 29, wherein the base comprises a compressible material.

31. The mount according to claim 29, wherein the anchor further comprises at least one channel to provide at least one path to route at least one cable.

32. The mount according to claim 29, wherein the at least one anchor is made out of a conducting material.

33. The mount according to claim 29, wherein each first anchor shoulder is made out of an elastic material.

34. The mount according to claim 29, wherein the first anchor surface has a cutout capable of surrounding the threaded nut.

35. The mount according to claim 29, wherein the at least one threaded nut and the at least one forcing cone are integrated into a single part.

36. The mount according to claim 29, wherein the at least one forcing cone has at least one forcing cone ridge proximate the first forcing cone side such that the at least one forcing cone and the at least second anchor shoulders form a snap lock to couple the at least one forcing cone to the at least one anchor.

37. The mount according to claim 29, wherein the at least one forcing cone has at least one forcing cone seat proximate the second forcing cone side such that the at least one anchor lip, the at least one anchor second shoulder, and the at least one extension reside in the at least one forcing cone seat when the at least one mounting unit is tightened.

38. The mount according to claim 29, wherein the at least one forcing cone has at least one of a triangle shape, a cone shape, a trapezoid shape, an spherical shape, and an elliptical shape.

39. The mount according to claim 29, further comprising:
   a panel; and
   the panel comprising at least one panel opening substantially aligned with the at least one base opening and the at least one housing opening, the at least one panel opening comprising at least one panel seating surface,
   such that the at least one anchor lip seats on the at least one panel seating surface when the at least one mounting unit is tightened.

40. The mount according to claim 39, wherein the at least one panel opening is sufficiently wide to allow removal of the antenna mounting device when the at least one mounting unit is loosened and sufficiently narrow to allow seating of the at least one anchor lip when the mounting unit is tightened.

41. A mount, comprising:

a housing;

a base;

the housing residing on the base;

the housing comprising at least one receptacle;

the base comprising at least one base opening;

the at least one receptacle aligned substantially above the at least one base opening;

at least one mounting unit, comprising:

at least one threaded screw, each of the at least one threaded screw comprising a housing end and a panel end, the threaded screw being contained in the at least one receptacle at the housing end such that the at least one threaded screw is relatively stationary;

at least one forcing cone, each forcing cone having a through hole through which the at least one threaded screw can pass comprises a first forcing cone side and a second forcing cone side connected by at least one forcing cone sidewall, the first forcing cone side having a first width resides in the proximity of the at least one base opening, the at least one forcing cone sidewalls extend away from the base, to the second forcing cone side, the second forcing cone second side having a second width less than the first width, at least one anchor, each anchor comprising a first anchor surface such that the first anchor surface has a through hole through which the threaded screw may pass, at least a first anchor shoulder, at least one extension, at least a second anchor shoulder, and at least one anchor lip, the first anchor surface connected to the at least one extension by the first anchor shoulder, the at least one extension connected to the at least one anchor lip by the second anchor should, the first anchor surface proximate the panel end and the anchor lips reside substantially along the at least one forcing cone sidewall;

at least one threaded nut, each of the at least one threaded nut being threaded on the threaded screw proximate the panel end such that the at least one anchor and the at least one forcing cone reside on the threaded screw between the at least one threaded nut and the housing end, such that screwing the at least one threaded nut on the at least one threaded screw moves the at least one anchor over the at least one forcing cone until the anchor lips contact a seating surface.

42. The mount according to claim 41, wherein the base comprises a compressible material.

43. The mount according to claim 41, wherein the anchor further comprises at least one channel to provide at least one path to route at least one cable.

44. The mount according to claim 41, wherein the at least one anchor is made out of a conducting material.

45. The mount according to claim 41, wherein each first anchor shoulder is made out of an elastic material.

46. The mount according to claim 41, wherein the at least one forcing cone comprises a key mechanism to inhibit rotation of the at least one forcing cone.

47. The mount according to claim 41, wherein the at least one forcing cone has at least one forcing cone ridge proximate the second forcing cone side such that the at least one forcing cone and the at least second anchor shoulders form a snap lock to couple the at least one forcing cone to the at least one anchor.

48. The mount according to claim 41, wherein the at least one forcing cone has at least one forcing cone seat proximate the first forcing cone side such that the at least one anchor lip, the at least one anchor second shoulder, and the at least one extension reside in the at least one forcing cone seat when the at least one mounting unit is tightened.

49. The mount according to claim 41, wherein the at least one forcing cone has at least one of a triangle shape, a cone shape, a trapezoid shape, an spherical shape, and an elliptical shape.

50. The mount according to claim 41, further comprising:

a panel; and the panel comprising at least one panel opening substantially aligned with the at least one base opening and the at least one housing opening, the at least one panel opening comprising at least one panel seating surface, such that the at least one anchor lip seats on the at least one panel seating surface when the at least one mounting unit is tightened.

51. The mount according to claim 50, wherein the at least one panel opening is sufficiently wide to allow removal of the antenna mounting device when the at least one mounting unit is loosened and sufficiently narrow to allow seating of the at least one anchor lip when the mounting unit is tightened.

52. The mount according to claim 41, wherein the at least one forcing cone has at least one latch to hold the at least one forcing cone to the base.

53. The mount according to claim 41, wherein the at least one forcing cone and the base are integrated into a single part.

* * * * *